(12) United States Patent
Rennie et al.

(10) Patent No.: US 11,652,436 B2
(45) Date of Patent: May 16, 2023

(54) ESCROW CLUTCH PROTECTION

(71) Applicant: NCR Corporation, Atlanta, GA (US)

(72) Inventors: Michael McLeod Rennie, Fife (GB); Scott Low Colston, Dundee (GB)

(73) Assignee: NCR Corporation, Atlanta, GA (US)

( * ) Notice: Subject to any disclaimer, the term of this patent is extended or adjusted under 35 U.S.C. 154(b) by 215 days.

(21) Appl. No.: 16/118,000

(22) Filed: Aug. 30, 2018

(65) Prior Publication Data
US 2020/0076346 A1 Mar. 5, 2020

(51) Int. Cl.
H02P 29/00 (2016.01)
G06Q 20/18 (2012.01)
F16D 48/06 (2006.01)
F16D 13/00 (2006.01)

(52) U.S. Cl.
CPC ......... *H02P 29/0027* (2013.01); *G06Q 20/18* (2013.01); *F16D 13/00* (2013.01); *F16D 48/06* (2013.01); *F16D 2500/1045* (2013.01); *F16D 2500/30406* (2013.01); *F16D 2500/7042* (2013.01)

(58) Field of Classification Search
CPC ..... H02P 29/0027; G06Q 20/18; B60K 6/387; B60W 10/02; B60W 2710/025; B60W 2710/083; B60W 20/40; B60W 2710/021
USPC .................................................. 600/117, 152
See application file for complete search history.

(56) References Cited

U.S. PATENT DOCUMENTS

| | | | | |
|---|---|---|---|---|
| 3,636,905 | A * | 1/1972 | Wilson | B63B 27/36 414/142.8 |
| 4,559,928 | A * | 12/1985 | Takayama | A61B 1/0052 600/152 |
| 5,735,516 | A * | 4/1998 | Gerlier | G07F 19/203 414/789.9 |
| 9,481,393 | B1 * | 11/2016 | Meyerhoffer | B62D 6/10 |
| 2005/0177294 | A1 * | 8/2005 | Jiang | F16D 48/066 701/67 |
| 2010/0100245 | A1 * | 4/2010 | Oishi | B65H 29/006 700/275 |
| 2011/0189460 | A1 * | 8/2011 | Chavdar | F16D 69/026 428/292.1 |
| 2020/0150644 | A1 * | 5/2020 | Cella | G05B 23/0291 |

* cited by examiner

Primary Examiner — Rina I Duda
Assistant Examiner — Zemenay T Truneh
(74) Attorney, Agent, or Firm — Schwegman Lundberg & Woessner, P.A.

(57) ABSTRACT

Disclosed are systems and methods for protecting an escrow clutch of a self-service terminal. The systems and methods may include actuating a motor of the self-service terminal to cause an escrow clutch of the self-service terminal to spin at a rate. As the clutch spins, a determination as to when a clutch slippage exceeds a preset slippage rate may be made. When the clutch slippage exceeds the preset slippage rate, the motor may be actuated to cause the escrow clutch to spin at a second rate. The second rate may less than the first rate.

14 Claims, 3 Drawing Sheets

ESCROW CLUTCH PROTECTION

SUMMARY

Disclosed are systems and methods for protecting an escrow clutch of a self-service terminal. The systems and methods may include actuating a motor of the self-service terminal to move a driving member of an escrow clutch of the self-service terminal to spin at a first rate, such as in revolutions per minute (RPM), while a driven portion of the clutch transmits torque to components within an escrow via frictional coupling with the driving member. Torque thus transmitted across the clutch may be controlled, such as by slipping between the driving and driven members of the clutch. As torque is transmitted, a determination as to when a clutch slippage exceeds a preset slippage rate may be made. When the clutch slippage exceeds the preset slippage rate, the motor may be actuated to cause the escrow clutch to driven by the motor at a second RPM. The second RPM may less than the first RPM.

BRIEF DESCRIPTION OF THE FIGURES

The above-mentioned and other features and advantages of this invention, and the manner of attaining them, will become more apparent and the invention itself will be better understood by reference to the following description of embodiments of the invention taken in conjunction with the accompanying drawings, wherein.

Corresponding reference characters indicate corresponding parts throughout the several views. The exemplifications set out herein illustrate exemplary embodiments of the invention, and such exemplifications are not to be construed as limiting the scope of the invention any manner.

DETAILED DESCRIPTION

Figure 1:
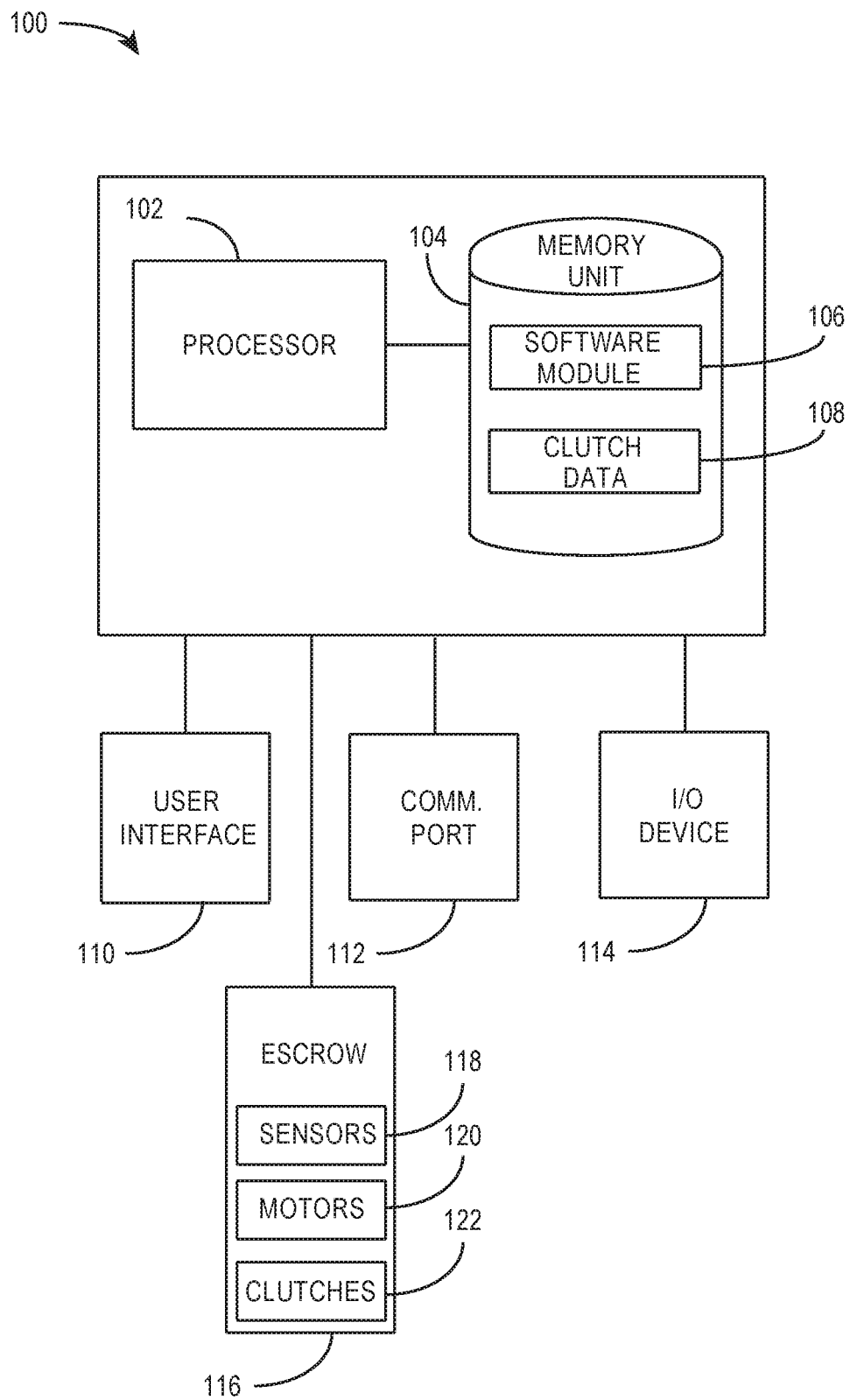
FIG. 1 shows an example schematic of a self-service terminal consistent with this disclosure.

The following detailed description refers to the accompanying drawings. Wherever possible, the same reference numbers are used in the drawings and the following description to refer to the same or similar elements. While embodiments and examples are described, modifications, adaptations, and other implementations are possible. For example, substitutions, additions, or modifications may be made to the elements and stages illustrated in the drawings, and the systems and methods described herein may be modified by substituting, reordering, or adding stages to the disclosed methods or elements to the disclosed systems. Accordingly, the following detailed description does not limit this disclosure. Instead, the proper scope of any invention disclosed herein is defined by the appended claims.

Modern self-service terminals (SSTs), such as automated teller machines (ATMs) can receive as many as 300 pieces of media, such as banknotes for deposit. The received media may be stored in an escrow module of the SST. The escrow module may include one or more motors, tapes, storage drums, and clutches.

Clutches may be introduced to regulate torque transmitted from motors to other components in the escrow module. In accordance with embodiments of the present disclosure, clutches may be configured to transmit motor torque across couplings that are designed to slip, as such as the torque across the coupling may exceed a preset value. Such couplings permit the escrow, for example, to maintain tension on transport tapes or other components within preset limits while keeping drive motor design simple. During high-volume transactions, however, clutches may be driven for longer periods, with the result that the clutches in the escrow module may overheat, exceeding design temperatures. The overheating of the clutches may result in malfunction of the clutch, with the result that the transmitted torque deviates from the preset value, most typically with output at the driven portion of the clutch being reduced. This reduction in torque output may result in media jams and/or damage to the escrow module, clutches, tapes, and drums.

To ensure the escrow can keep the tapes under the design tension they may be mounted on friction clutches which are sized to keep back tension in the system to prevent tape damage and efficiently store the notes. These clutches may be designed such that they strike the balance between tension and transaction load expected for the system. Due to this sizing constraint they may overheat in a hot environment or if the self-service terminal is used for large back-to-back transactions.

As disclosed herein, by monitoring the various components of the escrow, such as the current draw on the motors, the output from the clutches can be monitored in real time. When the output reaches a critical level, the self-service terminal can self-protect by slowing down or pausing the motors for a short period to allow the clutches to cool down.

Friction clutch torque output may be determined by monitoring motor current, if the current starts to drop off from an expected level, it can be inferred that the clutches are overheating and their output is fading. Continued use in an overheating state may cause jams due to loose tapes and could even burn out the clutch. By allowing the motors to slow down or pause, the clutches, escrow, and self-service terminal may be protected against jams and damage.

Turning now to the figures, FIG. 1 shows an example schematic of a self-service terminal 100. As shown in FIG. 1, self-service terminal 100 may include a processor 102 and a memory 104. Memory 104 may include a software module 106 and clutch data 108. While executing on processor 102, software module 104 may perform processes for restoring the performance of or protecting a clutch, including, for example, one or more stages included in a method 300 described below with respect to FIG. 3. Self-service terminal 100 also may include a user interface 110, a communications port 112, an input/output (I/O) device 114, and an escrow 116. Escrow 116 may include a plurality of sensors 118, motors 120, and clutches 122 as detailed below with respect to FIG. 2.

As disclosed herein, clutch data 108 may include data that may be used to operate and monitor clutches 122. For example, clutch data 108 may include a range of current draws by motors 120, ranges for changes in current draws for motors 120, range of torques for clutches 122, RPM vs. voltage equations for motors 120, power consumption/current/voltage vs. torque for motors 120, etc. In addition, clutch data 108 may include slippage values for clutches 122. For example, clutch data 108 may include desired slippage for clutches 122 when receiving notes.

User interface 110 can include any number of devices that allow a user to interface with self-service terminal 100. Non-limiting examples of user interface 110 include a keypad, a microphone, a display (touchscreen or otherwise), etc.

Communications port 112 may allow self-service terminal 100 to communicate with various information sources and devices, such as, but not limited to, remote computing devices, financial institutions, mobile devices such as a user's smart phone, peripheral devices, etc. Non-limiting examples of communications port 112 include, Ethernet cards (wireless or wired), Bluetooth® transmitters and receivers, near-field communications modules, etc.

I/O device 114 may allow self-service terminal 100 to receive and output information. Non-limiting examples of I/O device 114 include, a camera (still or video), a weight detection device such as a scale, a printer for print receipts, a scanner, etc.

Figure 2:
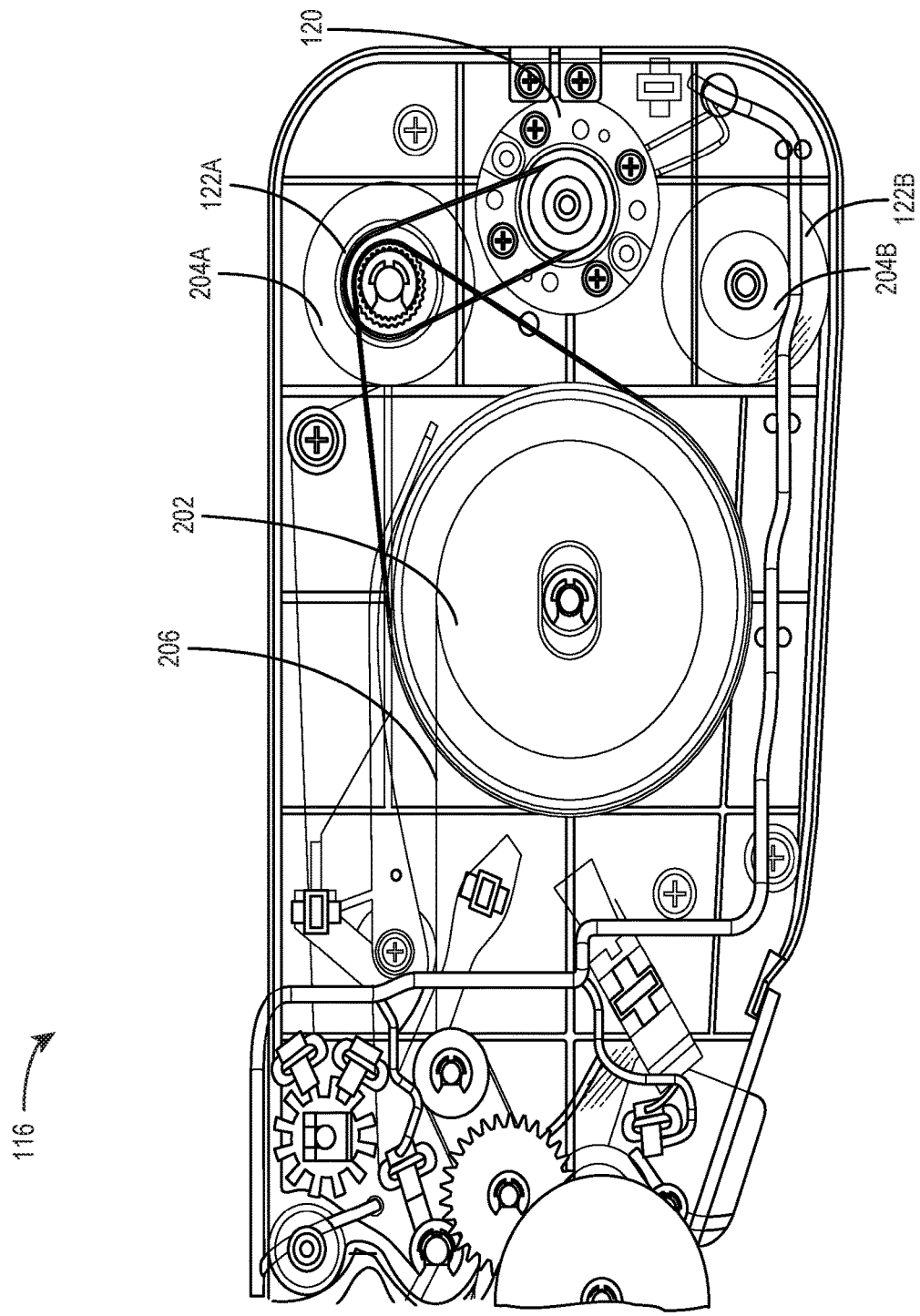
FIG. 2 shows an example escrow consistent with this disclosure.

FIG. 2 shows escrow 116. As shown in FIG. 2, escrow 116 may include motor 120, a first clutch 122A, a second clutch 122B, a storage drum 202, a first tape reel 204A, a second tape reel 204B (collectively tape reels 204), and tape 206. As storage drum 202 rotates clockwise it may pull tape 206 from tape reels 204. Tape 206 may be held under tension generated by clutches 122. For example, as storage drum 202 rotates clockwise, clutches 122 may exert a counter force by rotation of motor 120, and hence clutches 122, creating tension within tape 206. As storage drum 202 rotates counterclockwise tape 206 may be wound back onto tape reels 204 under tension provided by clutches 122.

When operating under a high duty rate, such as when more than 100 notes are being deposited, the torque generated by clutches 122 may be reduced. The reduction in torque may be caused by excess temperature generated by clutches 122. The excess temperature may cause excess slippage at clutches 122. The reduction in torque may cause a reduction in back tension in tape 206. The reduced back tension in tape 206 may cause a reduction in reliability of escrow 116 and self-service terminal 100 due to slack that may be present in tape 206.

As disclosed herein, processor 102 may be used to monitor the torque output at clutches 122. As disclosed herein, processor 102 may monitor the torque output at clutches 122 in a variety of ways. In one example, processor 102 may be used to monitor a current draw from motor 120. During normal operations, motor 120 may draw a predetermined current or a current within a predetermined range. For instance, during normal operations (i.e., when clutches 122 are not slipping excessively) motor 120 may draw X amps or X+/−Y amps.

Should self-service terminal 100 experience multiple transactions that require a high duty cycle and clutches 122 slip excessively, the current draw for motor 120 may decrease due to lower torque being generated at clutches 122. Thus, processor 102, which may be controlling the voltage applied to and monitoring the current drawn by motor 120 can determine the decrease in torque. As such, processor 102 can determine when the slippage of clutches 122 exceeds a preset slippage rate. Stated another way, when clutches 122 exceed the preset slippage rate, the current needed to spin motor 120 and clutches 122 at a present speed will decrease due to reduced load on motor 120, which is the result of less torque being transmitted by clutches 122 at the preset motor rotation speed. As a result, when processor 102 detects a drop in current draw below a preset value, such as a minimum current draw, or outside of the predetermined current range, processor 102 is able to determine that clutches 122 are overheating. In this example, motor current may be taken as a proxy for clutch temperature, where torque transmitted by the clutch has been shown to be at least partially temperature dependent. In this example, an independent sensor for measuring clutch temperature is not needed.

To determine excess clutch slippage, processor 102 may also monitor the temperature of clutches 122. For example, sensors 118, such as thermocouples, thermistors, or other temperature probes, may be located in close proximity to clutches 122. When clutches 122 exceed the preset slippage rate, sensors 118 may generate a voltage, exhibit a change in resistance, etc. that is measurable by processor 102. Using equations that may be stored in clutch data 108, processor 102 may determine when the slippage exhibited by clutches 122 exceeds the preset slippage rate by determining the temperature of clutches 122 exceeds a preset temperature. In this example, clutch temperature may be taken as a proxy for clutch torque, where the torque transmitted by the clutch has been shown to be at least partially temperature dependent.

As indicated above, current draw of motor 120 may be correlated to torque, which may be used to determine when the slippage of clutches 122 exceeds the preset slippage rate. In addition, torque may be directly measured. For example, sensors 118, such as strain gauges, may be placed on the shaft of motor 120. Sensors 118 may transmit a voltage to processor 102. Processor 102 may use equations stored in clutch data 108 to convert the voltages, or change in voltages, to a torque or change in torque. Thus, processor 102 may determine when the clutch slippage exceeds the preset slippage rate by determining when a torque generated by motor 120 decreases by a present torque change or decreases below a minimum torque.

Figure 3:
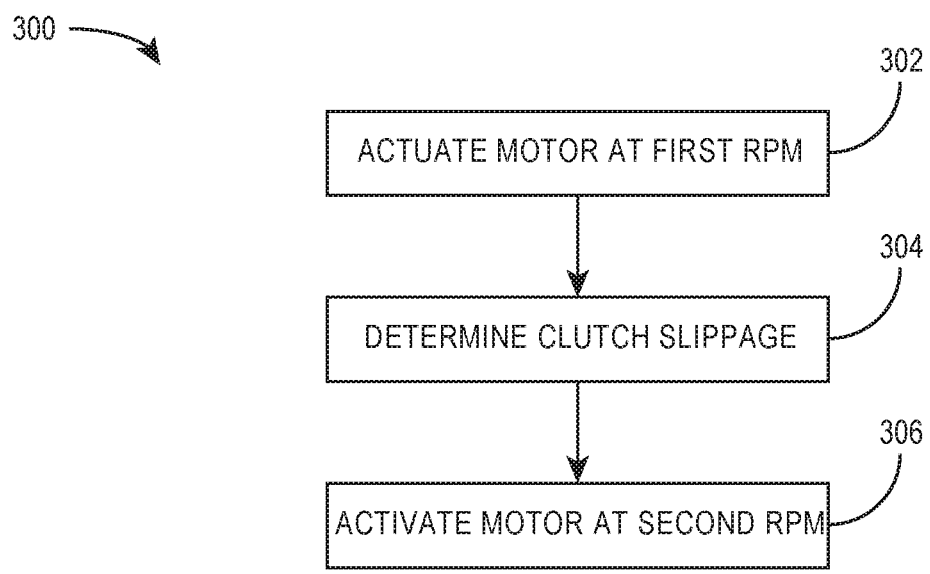
FIG. 3 shows an example method consistent with this disclosure.

FIG. 3 shows method 300 for protecting an escrow clutch, such as clutches 122, consistent with this disclosure. Method 300 may begin at stage 302 where a motor, such as motor 120, may be actuated. For example, a controller, that may include processor 102, may transmit a first voltage to the motor. The first voltage may cause the motor to spin at a first revolutions per minute (RPM).

From stage 302, method 300 may proceed to stage 304 where a determination as to when a clutch, such as any one of clutches 122, slip at a rate that exceeds a preset slippage rate. For example, as disclosed herein, the determination of clutch slippage may be determined by monitoring current drawn or changes in current draw by a motor, by monitoring torque or changes in torque produced by the motor, or monitoring a temperature of the clutches.

From stage 304, method 300 may proceed to stage 306 where the motor may be actuated at a second RPM. For example, when it is determined that a clutch is slipping excessively, a second voltage may be transmitted to the motor. The second voltage may be lower than the first voltage. As a result, the second RPM may be less than the first RPM.

Operating the motor at the second RPM, which is lower than the first RPM, may allow a self-service terminal, such as self-service terminal 100, to continue operations while also allowing the clutches to cool down. As a result, the clutch and/or the motor may be purposely undersized. Stated another way, the motor may be sized for an average transaction load such that the clutches do not overheat during average usage. The design specification of such a motor may be capable of temporary or short-term excursions outside its design limits, without significant degradation in clutch performance. However, during transaction loads that consistently exceed the average, the motor may temporarily spin faster to create the necessary back tension on tape, such as tape 206 with an escrow, such as escrow 116 for at least the duration of the transaction to prevent media jams for example. Such measures may be followed by temporary cooling-off measures such as pauses in motor operation, implementation of a reduced-performance duty-cycle, activation of external cooling measures (such as fans), prioritization of non-escrow related activities by the SST or slower media processing. After normal clutch performance is restored, for example, implementation of these measures may be discontinued.

EXAMPLES

Example 1 is a method for controlling a self-service terminal, the method comprising: actuating a motor of the self-service terminal to cause an input of an escrow clutch of the self-service terminal to spin at a first rate; determining when a clutch slippage exceeds a preset clutch slippage; and actuating the motor to cause the escrow clutch to spin at a rate, wherein the second rate is less than the first rate.

In Example 2, the subject matter of Example 1 optionally includes wherein determining when clutch slippage exceeds the preset clutch slippage comprises: determining the clutch slippage; and comparing the clutch slippage to the preset clutch slippage, the preset clutch slippage being dependent upon a current stage of a transaction.

In Example 3, the subject matter of any one or more of Examples 1-2 optionally include wherein determining when the clutch slippage exceeds the preset clutch slippage includes determining that a temperature of the escrow clutch exceeds a preset temperature.

In Example 4, the subject matter of any one or more of Examples 1-3 optionally include wherein determining when the clutch slippage exceeds the preset clutch slippage includes determining when a current draw by the motor decreases by a preset current change.

In Example 5, the subject matter of any one or more of Examples 1-4 optionally include wherein determining when the clutch slippage exceeds the preset clutch slippage includes determining when a current draw by the motor decreases below a minimum current draw.

In Example 6, the subject matter of any one or more of Examples 1-5 optionally include wherein determining when the clutch slippage exceeds the preset clutch slippage includes determining when a torque generated by the motor decreases by a preset torque change.

In Example 7, the subject matter of any one or more of Examples 1-6 optionally include wherein determining when the clutch slippage exceeds the preset clutch slippage includes determining when a torque generated by the motor decreases below a minimum torque.

In Example 8, the subject matter of any one or more of Examples 1-7 optionally include wherein actuating the motor to cause the escrow clutch to spin at the second rate includes decreasing a voltage applied to the motor.

In Example 9, the subject matter of any one or more of Examples 1-8 optionally include undersizing the motor for a maximum note capacity of an escrow of the self-service terminal.

Example 10 is a self-service terminal comprising: an escrow clutch; a motor operatively connected to the escrow clutch; and a controller to control operation of the self-service terminal, the controller operable to cause the self-service terminal to perform actions comprising: actuating the motor to cause an input of the escrow clutch to spin at a first rate, determining when a clutch slippage exceeds a preset clutch slippage, and actuating the motor to cause the input of the escrow clutch to spin at a second rate, wherein the second rate is less than the first rate.

In Example 11, the subject matter of Example 10 optionally includes wherein determining when clutch slippage exceeds the preset clutch slippage includes the controller operable to cause the self-service terminal to perform further actions comprising: determining the clutch slippage; and comparing the clutch slippage to the preset clutch slippage, the preset clutch slippage being dependent upon a current stage of a transaction.

In Example 12, the subject matter of any one or more of Examples 10-11 optionally include wherein determining when the clutch slippage exceeds the preset clutch slippage includes the controller operable to cause the self-service terminal to perform further actions comprising determining that a temperature of the escrow clutch exceeds a preset temperature.

In Example 13, the subject matter of any one or more of Examples 10-12 optionally include wherein determining when the clutch slippage exceeds the preset clutch slippage includes the controller operable to cause the self-service terminal to perform further actions comprising determining when a current draw by the motor decreases by a preset current change.

In Example 14, the subject matter of any one or more of Examples 10-13 optionally include wherein determining when the clutch slippage exceeds the preset clutch slippage includes the controller operable to cause the self-service terminal to perform further actions comprising determining when a current draw by the motor decreases below a minimum current draw.

In Example 15, the subject matter of any one or more of Examples 10-14 optionally include wherein determining when the clutch slippage exceeds the preset clutch slippage includes the controller operable to cause the self-service terminal to perform further actions comprising determining when a torque generated by the motor decreases by a preset torque change.

In Example 16, the subject matter of any one or more of Examples 10-15 optionally include wherein determining when the clutch slippage exceeds the preset clutch slippage includes the controller operable to cause the self-service terminal to perform further actions comprising determining when a torque generated by the motor decreases below a minimum torque.

In Example 17, the subject matter of any one or more of Examples 10-16 optionally include wherein actuating the motor to cause the escrow clutch to spin at the second RPM includes the controller operable to cause the self-service terminal to perform further actions comprising decreasing a voltage applied to the motor.

In Example 18, the subject matter of any one or more of Examples 10-17 optionally include wherein the motor is undersized for a maximum note capacity of an escrow of the self-service terminal.

Example 19 is a controller for a self-service terminal comprising: a processor; and a memory storing instructions that, when executed by the processor, cause the processor to: transmit a first voltage to a motor of the self-service terminal, the first voltage operative to cause the motor to spin an escrow clutch of the self-service terminal at a first rate, determine when a clutch slippage exceeds a preset clutch slippage, and transmit a second voltage to the motor, the second voltage operative to cause the motor to spin the escrow clutch at a second rate, wherein the second voltage is less than the first voltage.

In Example 20, the subject matter of Example 19 optionally includes wherein determining when clutch slippage exceeds the preset clutch slippage includes additional instructions that, when executed by the processor, cause the processor to: determine the clutch slippage; and compare the clutch slippage to the preset clutch slippage, the preset clutch slippage being dependent upon a current stage of a transaction.

In Example 21, the subject matter of any one or more of Examples 17-20 optionally include wherein determining when the clutch slippage exceeds the preset clutch slippage includes additional instructions that, when executed by the processor, cause the processor to: continuously measuring a current draw by the motor; and determining when the current draw changes by a preset current change.

In Example 22, the subject matter of any one or more of Examples 9-21 optionally include wherein determining when the clutch slippage exceeds the preset clutch slippage includes additional instructions that, when executed by the processor, cause the processor to: continuously measuring a current draw by the motor; and determining when the current draw decreases below a minimum current draw.

In Example 23, the subject matter of any one or more of Examples 17-22 optionally include wherein determining when the clutch slippage exceeds the preset clutch slippage includes additional instructions that, when executed by the processor, cause the processor to determine at least one of the following: when a temperature of the escrow clutch exceeds a preset temperature; when a torque generated by the motor decreases by a preset torque change.

It will be readily understood to those skilled in the art that various other changes in the details, material, and arrangements of the parts and method stages which have been described and illustrated in order to explain the nature of the inventive subject matter may be made without departing from the principles and scope of the inventive subject matter as expressed in the subjoined claims.

The invention claimed is:

1. A method for controlling a self-service terminal, the method comprising:
   actuating a motor of the self-service terminal to cause an input of an escrow clutch of the self-service terminal to spin at a first rate;
   determining when a clutch slippage exceeds a preset clutch slippage, wherein determining when the clutch slippage exceeds the preset clutch slippage comprises:
      determining the clutch slippage by determining when a current draw by the motor decreases by a preset current change; and
      comparing the clutch slippage to the preset clutch slippage, the preset clutch slippage being dependent upon a current stage of a financial transaction; and
   actuating the motor to cause the escrow clutch to spin at a second rate, wherein the second rate is less than the first rate,
   wherein the preset clutch slippage includes a desired slippage for the escrow clutch when the self-service terminal is receiving notes,
   wherein determining when the clutch slippage exceeds the preset clutch slippage further includes determining that a temperature of the escrow clutch exceeds a preset temperature without an independent clutch temperature sensor.

2. The method of claim 1, wherein the preset current change includes a current draw by the motor decreasing below a minimum current draw.

3. The method of claim 1, wherein determining when the clutch slippage exceeds the preset clutch slippage further includes determining when a torque generated by the motor decreases by a preset torque change.

4. The method of claim 1, wherein determining when the clutch slippage exceeds the preset clutch slippage further includes determining when a torque generated by the motor decreases below a minimum torque.

5. The method of claim 1, wherein actuating the motor to cause the escrow clutch to spin at the second rate includes decreasing a voltage applied to the motor.

6. A self-service terminal comprising:
   an escrow clutch;
   a motor operatively connected to the escrow clutch; and
   a controller to control operation of the self-service terminal, the controller operable to cause the self-service terminal to perform actions comprising:
      actuating the motor to cause an input of the escrow clutch to spin at a first rate,
      determining when a clutch slippage exceeds a preset clutch slippage, wherein determining when the clutch slippage exceeds the preset clutch slippage comprises:
         determining the clutch slippage by-determining when a current draw by the motor decreases by a preset current change; and
         comparing the clutch slippage to the preset clutch slippage, the preset clutch slippage being dependent upon a current stage of a financial transaction, and
      actuating the motor to cause the input of the escrow clutch to spin at a second rate, wherein the second rate is less than the first rate,
   wherein the preset clutch slippage includes a desired slippage for the escrow clutch when the self-service terminal is receiving notes, and
   wherein determining when the clutch slippage exceeds the preset clutch slippage further includes the controller operable to cause the self-service terminal to perform further actions comprising determining that a temperature of the escrow clutch exceeds a preset temperature without the use of a clutch temperature sensor.

7. The self-service terminal of claim 6, wherein the preset current change includes a current draw by the motor decreasing below a minimum current draw.

8. The self-service terminal of claim 6, wherein determining when the clutch slippage exceeds the preset clutch slippage further includes the controller operable to cause the self-service terminal to perform further actions comprising determining when a torque generated by the motor decreases by a preset torque change.

9. The self-service terminal of claim 6, wherein determining when the clutch slippage exceeds the preset clutch slippage further includes the controller operable to cause the self-service terminal to perform further actions comprising determining when a torque generated by the motor decreases below a minimum torque.

10. The self-service terminal of claim 6, wherein actuating the motor to cause the escrow clutch to spin at the second RPM includes the controller operable to cause the self-service terminal to perform further actions comprising decreasing a voltage applied to the motor.

11. The self-service terminal of claim 6, wherein the motor is undersized for a maximum note capacity of an escrow of the self-service terminal.

12. A controller for a self-service terminal comprising:
   a processor; and
   a memory storing instructions that, when executed by the processor, cause the processor to:

transmit a first voltage to a motor of the self-service terminal, the first voltage operative to cause the motor to spin an escrow clutch of the self-service terminal at a first rate, determine when a clutch slippage exceeds a preset clutch slippage, wherein determining when the clutch slippage exceeds the preset clutch slippage comprises:

continuously measuring a current draw by the motor, determining when the current draw decrease by a preset current change, and transmit a second voltage to the motor when the current draw changes by the value greater than the preset current change, the second voltage operative to cause the motor to spin the escrow clutch at a second rate, wherein the second voltage is less than the first voltage, wherein the preset clutch slippage includes a desired slippage for the escrow clutch when the self-service terminal is receiving notes, wherein determining when the clutch slippage exceeds the preset clutch slippage further includes the controller operable to cause the self-service terminal to perform further actions comprising determining that a temperature of the escrow clutch exceeds a preset temperature without the use of a clutch temperature sensor without the use of an independent clutch temperature sensor.

13. The controller of claim 12, wherein the preset current change includes the current draw decreasing below a minimum current draw.

14. The controller of claim 12, wherein determining when the clutch slippage exceeds the preset clutch slippage further includes additional instructions that, when executed by the processor, cause the processor to determine at least one of the following:

when a torque generated by the motor decreases by a preset torque change, when the torque generated by the motor decreases below a minimum torque.

* * * * *